Patented Feb. 9, 1937

2,070,363

UNITED STATES PATENT OFFICE 2,070,363

FROST PROTECTION FOR FLUSH TANKS

Jack C. Kur, Kansas City, Mo.

No Drawing. Application October 12, 1936, Serial No. 105,170

4 Claims. (Cl. 4—68)

My invention relates to the application of a physical principle; water, when freezing, expands. The expansion of water freezing in a toilet flush-tank will crack or break a porcelain, vitreous, china, or composition tank; it will bulge or burst a metal-lined wooden tank.

My invention is to place a lining of resilient matter against the inner walls of the tank. At low temperatures, the pressure of the freezing water is absorbed by this lining and failure of the tank through cracking or bursting is averted.

Any resilient lining can be used, but porous rubber is ideal. It can be moulded in sheets of various thickness and can be cut down to specific size to conform to particular tanks.

Stability of the lining against the inner walls can be assured by using tensile metal wires, shaped to conform to the tank, and pressing the lining against the walls. Stability can also be assured by incorporating metal wires when the lining is being manufactured, and then shaping to conformity.

1. I claim originality in the use of any resilient matter as a lining for toilet flush-tanks to absorb physical pressure of water during freezing, thus preventing failure of flush-tanks by cracking, breaking, or bursting.

2. I claim originality in the use of rubber, either solid or porous, as an inner lining for flush-tanks to absorb physical pressure of water during freezing, thus preventing failure of flush-tanks by cracking, breaking, or bursting.

3. I claim originality in the use of any resilient matter in flush-tanks to absorb physical pressure of liquids during freezing, thus preventing failure of said tanks by cracking, breaking, or bursting.

4. I claim originality in using metal wires incorporated in rubber to facilitate shaping and assuring rigidity when using said rubber as a lining for toilet flush-tanks to absorb physical pressure of liquids during freezing, thus preventing failure of flush-tanks by cracking, breaking, or bursting.

JACK C. KUR.